(12) United States Patent
Johnsen (10) Patent No.: US 9,234,123 B2
(45) Date of Patent: Jan. 12, 2016

(54) COMPOSITIONS FOR TOTALLY NON-FLAMMABLE AEROSOL DUSTERS

(71) Applicant: Montfort A. Johnsen, Danville, IL (US)

(72) Inventor: Montfort A. Johnsen, Danville, IL (US)

(73) Assignee: HSI Fire & Safety Group, LLC, Elk Grove Village, IL (US)

( * ) Notice: Subject to any disclaimer, the term of this patent is extended or adjusted under 35 U.S.C. 154(b) by 186 days.

(21) Appl. No.: 13/848,372

(22) Filed: Mar. 21, 2013

(65) Prior Publication Data

US 2014/0284516 A1 Sep. 25, 2014

(51) Int. Cl.
| | | |
|---|---|---|
| C09K 3/30 | (2006.01) | |
| C09K 3/22 | (2006.01) | |
| B65D 83/14 | (2006.01) | |
| B65D 83/44 | (2006.01) | |
| B65D 83/32 | (2006.01) | |
| B65D 83/36 | (2006.01) | |

(52) U.S. Cl.
CPC . *C09K 3/22* (2013.01); *B65D 83/44* (2013.01); *B65D 83/752* (2013.01); *B65D 83/7532* (2013.01); *C09K 3/30* (2013.01); *B65D 83/32* (2013.01); *B65D 83/36* (2013.01)

(58) Field of Classification Search
CPC .............. C09K 3/00; C09K 3/22; C09K 3/30; G01N 33/00; G01N 21/53; G01N 21/534; B65D 83/752; A61K 8/046
USPC ................. 252/364, 67, 68, 69, 408.1, 363.5; 510/406, 177, 412, 415; 516/8
See application file for complete search history.

(56) References Cited

U.S. PATENT DOCUMENTS

| | | | | |
|---|---|---|---|---|
| 7,708,903 | B2 * | 5/2010 | Sievert et al. ................... 252/68 |
| 2007/0096051 | A1 * | 5/2007 | Nappa et al. ...................... 252/2 |
| 2007/0098646 | A1 * | 5/2007 | Nappa et al. ..................... 424/45 |
| 2007/0100009 | A1 * | 5/2007 | Creazzo et al. ................. 521/98 |
| 2007/0100010 | A1 * | 5/2007 | Creazzo et al. ................. 521/98 |
| 2009/0204444 | A1 * | 8/2009 | Tucker et al. ...................... 705/4 |
| 2010/0112328 | A1 * | 5/2010 | Van Horn et al. .......... 428/304.4 |
| 2010/0163776 | A1 * | 7/2010 | Robin ................................ 252/2 |
| 2010/0243943 | A1 * | 9/2010 | Robin ................................ 252/3 |
| 2011/0006248 | A1 * | 1/2011 | Van Horn et al. ................ 252/68 |
| 2011/0088418 | A1 * | 4/2011 | Kontomaris et al. ........... 62/101 |
| 2011/0215273 | A1 * | 9/2011 | Uenveren et al. ............ 252/78.1 |
| 2011/0237844 | A1 * | 9/2011 | Tung et al. ...................... 570/151 |
| 2012/0085959 | A1 * | 4/2012 | Uenveren et al. ................. 252/2 |
| 2012/0117990 | A1 * | 5/2012 | Rached et al. .................. 62/115 |
| 2012/0119136 | A1 * | 5/2012 | Yana Motta et al. ............. 252/67 |
| 2013/0098396 | A1 * | 4/2013 | Lousenberg et al. .............. 134/6 |
| 2013/0099154 | A1 * | 4/2013 | Boussand et al. ................ 252/68 |
| 2013/0104575 | A1 * | 5/2013 | Kontomaris ....................... 62/79 |
| 2013/0111970 | A1 * | 5/2013 | Johnsen ........................ 73/1.06 |
| 2013/0247602 | A1 * | 9/2013 | Boutier et al. .................. 62/115 |
| 2013/0255284 | A1 * | 10/2013 | Rached ............................. 62/77 |
| 2013/0298581 | A1 * | 11/2013 | Kontomaris ....................... 62/98 |
| 2014/0048739 | A1 * | 2/2014 | Rached et al. .................. 252/67 |
| 2014/0083119 | A1 * | 3/2014 | Rached ............................. 62/79 |
| 2014/0191153 | A1 * | 7/2014 | Yana Motta et al. ............ 252/67 |
| 2014/0284516 | A1 * | 9/2014 | Johnsen ......................... 252/67 |

FOREIGN PATENT DOCUMENTS

WO  WO 2009108547 A1 *  9/2009
WO  WO 2012069725 A1 *  5/2012

* cited by examiner

*Primary Examiner* — Douglas McGinty
(74) *Attorney, Agent, or Firm* — Freeborn & Peters LLP (57) ABSTRACT

A composition of matter for the self-pressurized (aerosol) spraying of dusters and similar products. The composition includes a fluorinated propene-based propellant and fluorinated butene-based volatile solvent. The composition is totally non-flammable under all reasonably foreseeable conditions of use. The fluorinated propene-based propellant may include trans-1,3,3,3-tetrafluoroprop-1-ene, as typified by Honeywell Fluorine Products Division's SOLSTICE® HFO-1234ze(E) product. The fluorinated butene-based volatile solvent may include cis. (or cis./trans.) 1,1,1,4,4,4-hexafluoro-2-butene, as typified by the DuPont Fluorochemicals Division's FORMACEL® 1100 (HFO-1336mzz) product. The fluorinated propene-based propellant component may be present at about 60 to 95%. The fluorinated butene-based volatile solvent component may be present at about 5% to 40%, but preferably between about 20% to 25% and ideally at about the azeotropic concentration of about 22%. Some or all of the fluorinated butene based component may be replaced with up to about 25% of a totally non-flammable component, such as iodotrifluoromethane (CIF$_3$).

14 Claims, 7 Drawing Sheets

FIG. 1

PHYSICAL PROPERTIES OF trans-1,3,3,3-TETRAFLUOROPROP-1-ENE

| | |
|---|---|
| Other Name: | HFO1234ze(E) (Aerosol Industry) |
| Physical Characteristics: | Clear, colorless, almost odorless liquid. |
| Boiling Point: | -19.4°C. (-3.0°F.) |
| Liquid Density: | 1.17 g/mL at 21°C. (70°F.) |
| Pressure: | 47 psi-gauge at 21°C. (70°F.) |
| | 140 psi-gauge at 54.4°C. (130°F.) |
| Water Solubility: | Almost insoluble |
| Flammability: | None, up to 27.5°C. (79°F.) ASTM E681-2001. |
| | 7.7 to 8.8% by volume of gas at 30°C. (86°F.) |
| Minimum Ignition Energy: | c.a. 62,500 mJ at 54.4°C. (130°F.) |

ENVIRONMENTAL AND TOXICOLOGICAL PROPERTIES

| | |
|---|---|
| Ozone Depletion Potential: | ODP = 0 |
| Global Warming Potential: | GWP = 6 (100 year ITH; NOAA 2011) |
| Volatile Organic Compound: | Not a VOC. (U.S.EPA) |
| Min. Incremental Reactivity: | 0.09 (g. ozone per g.) |
| Toxic Substance Control Act: | Listed by TSCA in JAN-2011. |
| Significant New Alternatives: | Listed by SNAP in JUN-2010. |
| Inhalation Toxicity (Rats): | "Excellent results" (Honeywell) |
| Skin and Eye Irritation: | "Favorable profiles" (Honeywell) |
| Ames Test: | Non-mutagenic. |
| Applicable Exposure Limit: | 800 ppm. (AIHA WEEL; 8 hour weighted average) |
| Purity: | >99% (priv. comm.- Honeywell) |

FIG. 2

PHYSICAL PROPERTIES OF trans-1,1,1,4,4,4-HEXAFLUORO-2-BUTENE

| | |
|---|---|
| Other Names: | HFO 1336 mzz (Aerosol Industry) |
| | E 1,1,1,4,4,4-Hexafluoro-2-butene (Geneva Convention) |
| | FEA 1100 (Refrigeration and foamed plastics industries) |
| | Formacel® 1100 (E.I. DuPont de Nemours, Inc. trade name) |
| Physical Characteristics: | Clear, colorless, almost odorless liquid. |
| Boiling Point: | 33.4°C. (93.2°F.) |
| Liquid Density: | 1.4 g/mL. at 20°C. (68°F.) |
| Pressure: | 8.77 psi-absolute at 20°C. (68°F.) |
| | 22.1 psi-gauge at 50°C. (122°F.) |
| | 31.5 psi-gauge at 54.4°C. (130°F.) |
| Water Solubility: | Almost insoluble |
| Flammability: | None. (ASTM E681-2001 at 60°and 100°C.) |

ENVIRONMENTAL AND TOXICOLOGICAL PROPERTIES

| | |
|---|---|
| Ozone Depletion Potential: | ODP = 0 |
| Global Warming Potential: | GWP = 9.7  [NOAA (2011)] |
| Volatile Organic Compound: | Estimated to be a non-VOC. |
| TSCA, SNAP and PMN: | DuPont has applied for listings. |
| Inhalation Toxicity (Rats): | LC50 >102,500 ppm. |
| Four hour Inhalation Tox.: | Very low acute toxicity. |
| 28 Day Repeated Inhalation: | Favorable profile. |
| Skin Irritation: | Non-irritating. |
| Ames Test: | Non-mutagenic. |
| Applicable Exposure Limit: | AEL (DuPont): 500 ppm. (8 and 12 hour TWA) |

NOTE: Product contains a small amount of the cis-isomer.

FIG. 5

Mitani S-13 Aerosol Valve

1. Mounting Cup
2. Stem
3. Housing
4. Stem Gasket
5. Spring
6. Cup Gasket
7. Dip Tube
8. Bushing

COMPOSITIONS FOR TOTALLY NON-FLAMMABLE AEROSOL DUSTERS

CROSS-REFERENCE TO RELATED PATENTS OR APPLICATIONS

The applicant is not aware of any Patent or Patent Application that provides the information presented in this application.

FIELD OF THE INVENTION

This invention generally relates to aerosol dusters. More specifically, this invention relates to novel, totally non-flammable compositions of matter for aerosol products designed to remove dust from sensitive surfaces.

BACKGROUND OF THE INVENTION

Self-pressurized (aerosol) dispensers for dust removal have been marketed since at least about 1960. They were originally formulated using 100% CFC-12 (dichlorodifluoromethane), or sometimes 100% CFC-114 (sym. dichlorotetrafluoroethane), which are totally non-flammable. The non-flammability of these products permitted them to be safely used, even near open flames, or where electrical or electronic equipment might generate sparks with sufficient energy to ignite potentially flammable sprays. When the CFC propellants were almost entirely banned by the U.S. government, as of 1 Apr. 1978, the industry reformulated the aerosol duster products to utilize a totally non-flammable blend of 40% HCFC-22 (monochlorodifluoromethane) and 60% HCFC-142b (1-chloro-1,1-difluoroethane). Marketers then faced two problems. The HCFC-22 was discovered to be a very weak mutagen, and the method of operation—by emitting gas from the vapor space above the liquid—resulted in the depletion of the more volatile, totally non-flammable HCFC-22 during use, so that the sprayed vapors gradually become so enriched with HCFC-142b that they became slightly flammable. More HCFC-22 could not be added to the formulation because the internal pressure would then exceed the 180 psi-gauge limit at 130 F. (degrees Fahrenheit) under U.S. DOT (Department of Transportation) regulations. With no other course of action the aerosol duster industry tolerated these problematic circumstances until about 1993, when the U.S. EPA (Environmental Protection Agency) banned the two propellants after determining that they, like the CFCs, were capable of stratospheric ozone deletion. The duster industry went into a brief decline until 1994, when DuPont (E.I. DuPont de Nemours and Company, Inc.) introduced HFC-134a (1,1,1,2-tetrafluoroethane) as a totally non-flammable propellant. Although it was primarily designed to be used in such pharmaceuticals as MDIs (Metered Dose Inhalants), the propellant proved useful for aerosol dusters and certain other products. Unfortunately, it had a vapor pressure of about 202 psi-gauge at 130 F. and thus it exceeded the DOT regulations for interstate transportation. The issue was quickly resolved by the use of so-called "pressure relief" aerosol cans, where three-piece tinplate cans were produced with approximately 12 tiny, work-hardening notches upon the top of the top double seam. When a can might be accidentally heated, causing an exorbitant rise in internal pressure, the dome (or top section) would rise, permanently deforming and eradicating the countersink and causing the notched locations to open, lense-like, and release the propellant safely, well below the pressure range at which the dispenser might burst. A two-piece aerosol can was also developed, where the base section was precisely indented so that, when it inverted due to excess pressure, the crescent-shaped indented area would crack and open, allowing the rapid and safe discharge of propellant. All these aerosol cans, with their heavy pressure resistant construction and specialized pressure relief fitments, are known as "DOT Specification 2Q—exempt" dispensers and are unusually high in cost.

From 1995 to about 2010 virtually all aerosol dusters used 99.9 to 100.0% HFC-134a. (The 99.9% formulas contain a very small amount of a repugnant additive, designed to counteract a life threatening incident where a person deliberately concentrates propellant vapors and inhales them deeply, hoping to get a brief psychedelic "high".) Since about the year 1998 concerns about the environmental compatibility of HFC-134a have greatly increased. It is a well-recognized global warming agent, with a potential 1320 times as great as carbon dioxide. For over a decade DuPont and other HFC-134a suppliers have utilized multi-disciplinary committees to either approve or disapprove the sale of HFC-134a to prospective buyers. They consider the product type, the requirement in tons per year, if an alternative propellant could be used and other factors; but the most important is the intended use. If the HFC-134a would contribute to life safety and health the committee might approve the request. But for ordinary, and certainly for frivolous products, the application would be denied. The aerosol duster products, while approved to use HFC-134a, have long been considered borderline. The situation became more critical in 2008, when the California Senate passed their SA-32 Bill into law. It directed CARB (California Air Resources Board) to undertake immediate actions to reduce, to the greatest extent possible, the manufacture and use of HFCs and other global warming chemicals. The CARB regulators quickly selected aerosol dusters as their first targeted product. After a number of studies they concluded that the HFC-134a could be safely replaced with HFC-152a (1,1-difluoroethane), a much less potent global warming agent, with a potential of only about 134 times that of carbon dioxide. Unfortunately, HFC-152a is somewhat flammable, eliminating its safe use in certain areas where ignition sources might be present. The final result was that HFC-152a has now replaced HFC-134a in about 80 to 85% of the aerosol dusters sold in California. At least one NGO (Non-Governmental Organization) has pointed out that the combustion or pyrolysis of HFC-152a produces HF (hydrogen fluoride) an extremely poisonous and corrosive gas, with a mammalian toxicity somewhat greater than that of HCN (hydrogen cyanide). More recently, about 2009, the U.S. Congress directed the U.S. EPA to develop regulations that would act to phase out the HFCs and certain other global warming agents within about a decade. The assignment is very complicated and slow, but the agency has announced that the first reduction, to 83% of the benchmark year of 2005, will be finalized soon. The program is a slow one because it will affect not only aerosols, but air-conditioners, food freezants, foaming agents and other uses, unless they are exempted.

Until rather recently the mix of private and government restrictions on HFC-134a—the only available totally non-flammable propellant—were very unsettling to duster product marketers. The enforced use of somewhat flammable HFC-152a evoked concerns about fires, toxicity and possible lawsuits. Other totally non-flammable propellants, such as HFC-227ea (1,1,1,3,3,3-heptafluoropropane) and HFC-245fa (1,1,1,3,3-pentafluoropropane) were more intense global warming agents than HFC-134a, and often too low in pressure to produce good atomization. But during about 2010 both DuPont and Honeywell (Honeywell Fluorine Products Division) announced that they were developing new products called HFOs (hydrofluoroolefins). DuPont's primary focus was on HFO-1234yf (1,1,1,2-tetrafluoroprop-1-ene) which is only slightly flammable and considered suitable for automobile air-conditioning systems as a replacement for HFC-134a. Pilot plant quantities were available, while a major production facility was being constructed in the People's Republic of China. The isomeric product created by Honeywell was of greater interest. It is known as HFO-1234ze(E) (trans-1,3,3,3-tetrafluoroprop-1-ene) which is even less flammable, and actually totally non-flammable at temperatures below about 26 C. (degrees Celsius) (79 F.). Pilot line quantities were available from Buffalo, N.Y., while a major production facility was being constructed in the company's plant at Baton Rouge, La. Both products, being olefins, were found to be destroyed by atmospheric OH' (hydroxyl free radicals) at rates about 320 times as fast as the corresponding HFC compounds. As a result they have very brief half-lives in the atmosphere and very low GWPs (Global Warming Potentials). The physical and toxicological properties of HFO-1234ze(E) are presented in FIG. 1.

While a few U.S. and European marketers have marketed aerosol dusters with either pure HFO-1234ze(E) or mixtures of HFO-1234zer(E) and HFC-134a—sometimes with the 0.1% or so addition of deliberate inhalation repellent, as described above, the current high price of HFO-1234ze(E), produced on a pilot line to date, has been a marketing deterrent. The price should decrease significantly when full-scale production begins. The very slight flammability would be a secondary deterrent. This is less easily correctable and forms the basis of this Patent Application.

As is well known to physicists, most chemists and chemical engineers, when two liquids of different volatility are mixed and form a solution, the gas phase above the solution will usually contain more of the volatile ingredient than the solution. This is the basic principle of fractional distillation, used to separate liquids of different volatility. An example would be the separation of propane and iso-butane. Propane has a pressure of 122 psi-absolute at 21 C. (70 F.), while iso-butane has a pressure of 45 psi-absolute at 21 C. (70 F.)—or about 37% that of propane. Thus, the vapor above a solution of 50% propane and 50% iso-butane will be about 82% propane and 18% iso-butane by weight. (A more accurate calculation must be on a molar basis.) The calculation will be valid for binary mixtures where the molecules of the two components are neutral to each other. In these ideal situations the molecules neither attract nor repel each other.

Much less commonly and less well known are situations where molecules repel each other. In binary mixtures of polar and apolar liquids, for example, the molecules will usually repel each other and this will lead to pressures that are higher than those that can be calculated on the basis of ideal liquids. In some cases, especially where the two liquids have similar individual pressures, the pressure developed by certain mixtures may be higher than that of the pure, more volatile liquid. When graphed, often on a mol-percent basis, the solution pressure can be seen as a humped up or upward arching curve. The composition at the highest point of this curve is called the azeotropic blend, and the pressure at that point is called the azeotropic pressure. At the azeotropic condition the compositions of both liquid and vapor are the same. More specifically, this is known as the positive azeotrope. Even more rarely, there are certain liquid solutions where the different molecules have an affinity or attraction for each other. In such cases the pressures are suppressed to levels below the theoretical values. When graphed the pressure trace will be seen to droop downward forming a catenary curve. If the lowest point is below the pressure of the less volatile component it is called the negative azeotropic pressure or composition.

Since aerosol propellant blends at the positive azeotropic composition have the same composition in both the liquid and vapor phases, it follows that any release of the vapor through an aerosol valve will not change the composition of the liquid phase. If this condition could be established for a totally non-flammable propellant blend, the result would be of great interest for such products as dusters, portable boat horns, freezants for the testing of electronic circuit boards and other specialized applications. Conversely, if a mixture behaved in the most commonly seen ideal fashion, or even with molecular attractions but not capable of producing a positive azeotrope, then as the vapor phase of the duster type aerosol is dispensed, the composition of the liquid would progressively change, leading to a much higher concentration of the less volatile component and the development of a lower delivery rate and a less effective spray, sometimes with a streaming center portion. Such products would be unacceptable in the market.

The Honeywell HFO-1234ze(E) propellant, introduced to the aerosol industry in a trade journal article (Spray Technology & Marketing, May 2011), disclosed that mixtures of between 7.7 and 8.7 volume-percent HFO-1234ze(E) gas in air, at 30 C. (86 F.) were flammable, according to an official ASTM E 681 test method. Upon request, other documents were obtained from Honeywell, showing that the flammable range rapidly increased with rising temperatures. This is a very common occurrence. Using the additional Honeywell LFL (Lower Flammability Limit) and UFL (Upper Flammability Limit) data a graph was constructed showing the flammable range as a function of gas concentrations and temperature. Based upon a very modest graphic extrapolation it was then established that a mixture of about 8.2 volume-percent HFO-1234ze(E) gas in air would become potentially flammable at temperatures equal to or greater than 26 C. (79 F.). When an aerosol of the duster type is actuated the gas-air mixture will range from very concentrated gas near the spray head to ultimately very dilute gas compositions as the gas becomes progressively more and more admixed with the large mass of surrounding air. During this transition, if the ambient temperature is 26 C. (79 F.) or higher, compositions in the flammable range will be produced.

At a temperature of 40 C. (104 F.) the flammable range became considerably enlarged, extending from 6.6 to 10.0 volume-percent of the gas, and at a test temperature of 60 C. (140 F.) the flammable range became quite significant: from 5.8 to 11.3 volume-percent of HFO-1234ze(E). The State of California has determined that about 15% of all aerosol dusters are used in areas where free flames are present. They are usually in industrial settings. In other situations high-energy electrical sparks may be encountered where warm air or equipment can cause the large MIR (minimum ignition energy) of HFO-1234ze(E) to be exceeded and produce an ignition. In Japan, where their equivalent of the ASTM E 681 test is conducted at 30 C. (86 F.), HFO-1234ze(E) is classified as flammable.

Reducing the admittedly slight flammability of HFO-1234ze(E), and thus contributing to life safety and health, was the primary focus of the research program. This had to be done by the addition of the smallest possible amount of totally non-flammable liquids or gases. Ideally, the additives would have to be environmentally compatible, commercially available and be toxicologically innocuous. They had to be colorless, essentially odorless, and soluble in the HFO-1234ze(E) primary ingredient. Carbon dioxide was considered, for instance, but only about 1.5% could be added before the pressure in the aerosol dispenser reached the U.S. DOT imposed limit of 180 psi-gauge at 54.4 C. (130 F.). Water might have been useful, except that it was almost totally insoluble in HFO-1234ze(E). HFC-134a could have been a candidate but for its high global warming potential and concomitant regulatory problems. Other totally non-flammable HFC propellants had similar problems. A rather exotic compound: iodotrifluoromethane (CIF3), was considered, but it was determined to be a non-commercial gas-liquid. Finally, we came across a volatile liquid, developed by DuPont and known as HFO-1336mzz (1,1,1,4,4,4-hexafluorobut-2-ene). It was designed to function as a totally non-flammable foaming agent for plastics, used in mattresses and upholstered furnishings. It was not yet TSCA (Toxic Substance Control Act) approved for marketing purposes, but had all the desired attributes except one: it was a liquid boiling at 33.4 C. (92.1 F.). Additional physical and toxicological properties are described in FIG. 2.

Initially, the HFO-1336mzz was of minor interest, since it was so low in pressure that it was thought to accumulate in the liquid phase of the aerosol dispenser as the vapor phase was dispensed. This would create low delivery rate and very coarse spray problems, as described above. The possibility of azeotropy was dismissed because HFO-1234ze(E) and HFO-1336mzz, being hydropolyfluorinated olefins, were so similar in electronic molecular composition and configuration that this highly desirable effect was deemed impossible. Nevertheless, a sample was obtained from DuPont and several aerosol formulations were produced for testing purposes. The spray patterns were excellent, and when pressures were taken at the aerosol reference temperatures it was discovered that the 21 C. (70 F.) pressures clearly demonstrated an azeotropic condition. Surprisingly, there was no azeotropy at 54.4 C (130 F.), although pressures were higher than those calculated for an ideal system. The lack of azeotropy at the higher temperature is academic, since aerosols are never sprayed with the dispensers heated to 54.4 C. (130 F.). Pressures at this temperature are only taken to assure compliance with U.S. DOT regulations. Additional studies showed that azeotropy remained present to at least 36 C. (97 F.). This would show that the very beneficial azeotropic condition would be in existence for all reasonably foreseeable temperatures at which the aerosol duster dispensers would be used.

U.S. regulators have a long history of applying certain test procedures and pass/fail criteria to aerosols, primarily used for warning labels and the marking of outer shipping cartons. Safety aspects, such as pressure limits and filling limits (as a percent of dispenser capacity) are also regulated. In the complex area of aerosol flammability we have the Flame Propagation Test, used by the U.S. CPSC (Consumer Product Safety Commission), the U.S. EPA (Environmental Protection Agency), and formally by the U.S. DOT (Department of Transportation). It requires that the aerosol, first equilibrated to 21 C. (70 F.), be sprayed through the top third of a candle flame from a distance of 152 mm. (6 inches). If the spray ignites, producing a fire plume longer than 457 mm. (18 inches) from the candle the dispenser of that product must be labeled with the signal word "Flammable" followed by standard precautions—provided the dispenser capacity is 118.2 ml (4 fluid ounces) or greater. This does not mean that products passing this test may be labeled as "Non-Flammable", unless they also pass the ASTM E 681 Test. Quite often they may just have a somewhat lesser degree of intrinsic flammability, such as the ability to produce a flame only 406 mm (15 inches) long.

A second test is the Closed Drum Test (in Europe, the Enclosed Space Test). While currently obsolete in the U.S. it is currently used in Europe, Japan, by other nations, and by certain international transportation organizations, such as IMO (International Maritime Organization) and IATA (International Air Transport Agency). In the interest of global harmonization of aerosol labeling and shipping both the FEA (Federation of European Aerosol Associations—representing 17 countries) and the UN (United Nations) are seeking to re-establish this test in the U.S. The test consists of spraying a fixed amount of aerosol product into a 205 liter (55 U.S. Gallon) metal drum or similar vessel, which is laid on its side and contains a lit candle or gas burner. The open end of the drum is covered with a thin film of polyethylene, in which a 200 mm. (8 inch) slit has been made. If the LFL is reached within the time or weight limit a large volume of flame will be produced, normally accompanied by a "whooshing" sound, and with heat and pressure sufficient to rupture the plastic film. Here again there will be aerosol products that will pass the test but would fail it if more product entered the drum. Aerosols that pass this test must not be labeled as "Non-Flammable", unless they also pass the ASTM E 681 Test. In a few cases they have been legally labeled as "Non-Flammable by the Closed Drum Test", or the equivalent. Even these modified warnings can lead to consumer confusion and possible misuse of the product.

A listing of the official aerosol flammability tests, including the two described above, is presented as follows:
 a. The Flame Propagation Test.
 b. The Flashback Test.
 c. The Closed Drum Test. Japan, IMO, IATA, et al.)
 d. The Ignition Distance Test (Europe and the U.N.)
 e. The Enclosed Space Test (Europe and the U.N.)
 f. The Foam Flammability Test (Europe and the U.N.)
 g. The U.S. CPSC Open Cup Flash Point Test
 h. The U.S. EPA Open Cup Flash Point Test.
 i. Other tests have been published, such as the Closed Cup Flammability Test and the 200 C. (392 F.) Preheated Hot Plate Test, but they have no official sanction.

All of these tests are used to differentiate aerosols according to their relative flammability. None of them, either individually or in concert, can be used to qualify an aerosol product as "Totally Non-Flammable", "Almost Completely Non Flammable" or "Non-Flammable". However, in the USA and Canada there are no laws or regulations that would prevent an over-jealous marketer from marking his aerosol product as being "Non-Flammable" or the equivalent, provided it passes that country's applicable official flammability tests. The primary deterrent for companies considering such labeling is being accused of "failure to warn" or "misleading labeling" in the event of an accident involving fire. A secondary deterrent is that the U.S. FTC (Federal Trade Commission) may respond to complaints from competitors and determine that such products are labeled with false advertising statements.

In the USA the only test for establishing "Non-Flammability" is the ASTM E-681 (American Society for Testing Materials Method E-681) assay. The test equipment utilizes a five liter (c.a. 1.2 U.S. Gallon) pressure resistant glass flask with an enclosed sparking device. A precisely measured amount of the aerosol product is introduced, the atmospheric pressure in the flask is restored to the ambient air pressure, and the sparking device is actuated. The test is typically conducted at 68 F. If no flame propagation occurs, that particular gas-air mixture is deemed to be non-flammable. The testing is continued, using a multiplicity of gas-air mixtures. Flammability is said to occur if a flame is produced that reaches the wall of the container. The effect must occur at an angle greater than 90 degrees from the spark source. For a gas to be considered flammable, a positive result must occur at a gas concentration of less than 12 volume percent. The term "gas", as used in the test, means a fluid (including mixtures) with a boiling point of 20 C. (68 F.) or lower, under the atmospheric condition of 760 mm. of mercury absolute pressure.

The lowest concentration of gas in air that produces the above flame propagation is known as the LFL (Lower Flammability Limit). The highest concentration of gas in air that still produces the above flame propagation is designated as the UFL (Upper Flammability Limit.). The terms LEL and UEL are used interchangeably with LFL and UFL, resp. The "E" stands for "Explosive". The "window of flammability" between the LFL and UFL is described as the "vapor flame limits" or "flammable range". Gases that exhibit a flammable range at 20 C. (68 F.) are considered to be "Flammable" by this test. Conversely, gases that fail to produce an LFL or UFL at 20 C. (68 F.) are considered to be "Non Flammable". During the last decade the test has been expanded by those seeking to demonstrate that a gas or gas mixture remains non-flammable at such elevated temperatures as 40 C. (104 F.), 60 C. (140 F. and even 100 C. (212 F.). This is because some gases that are marginally non-flammable at 20 C. (68 F.) may become flammable as the temperature is increased. This is the case with HFO-1234ze(E), which becomes flammable at about 26 C. (79 F.), and with the flammable range widening significantly as the temperature is further increased. This is demonstrated by the graph in FIG. 3. In contrast, DuPont has shown that HFO-1336mzz (a key factor in this Patent Application) remains non-flammable, even when tested at 100 C. (212 F.).

The European counterpart to the ASTM E-681 test is the EU A11 test. The apparatus consists of a 56 mm. (2 inch) inside diameter by 304 mm. (12 inch) long glass tube with an internal ignition source composed of an electric sparking device that lights a match. The procedure and assessment criteria are similar to those applied in the ASTM E-681 method.

To positively define the flammability or non-flammability of their HFO-1234ze(E) product Honeywell tested it using both the ASTM E-618 and EU A11 test methods. Their results are summarized as:

Method ASTM E-618:
 a. At 68 F. No flammability. (No LFL or UFL.)
 b. At 86 F. LFL=7.8 volume-% and UFL=8.7 volume-%. (Flammable.)
 c. At 140 F. LFL=5.8 volume-% and UFL=11.3 volume-%. (Flammable.)
 d. At 212 F. LFL=5.8 volume-% and UFL=11.8 volume-%. (Flammable.)
Method EU A11:
 a. At 73 F. No flammability. (No LFL or UFL.)
 b. At 212 F. LFL=7 volume-% and UFL=12 volume-%. (Flammable.)

One may conclude from this rather intensive testing that Honeywell's HFO-1234ze(E) begins to develop a flammable range at about 26 CF. (79 F.). The range rapidly increases with rising temperature.

Whenever an aerosol is sprayed the gaseous content of the spray becomes increasingly diluted with ambient air. The gaseous concentration then runs from essentially 100% at or very close to the spray actuator terminal orifice, moving ultimately down to essentially 0% when fully diluted with air. During the spraying episode some parts may be ephemerally diluted into the critical area, such as 7.7% to 8.7% if the temperature is at 30 C. (86 F.). If the temperature is 26 C. (79 F.) or higher, and a free flame or intense spark is present as an ignition source, then an ignition may become possible, perhaps with serious consequences. In another scenario, spraying onto a warmed or heated surface may raise the temperature of the spray to the point where combustion may occur if a suitable ignition source is also present. The potential for a fire hazard increases with increasing temperature, since the flammable range broadens.

In considering the addition of totally non-flammable fluids (gases or volatile liquids) to HFO-1234ze(E) to decrease its slight flammability profile we have invoked the approximation that HFC and HFO compounds become non-flammable when their fluorine content is about 67% or higher. This percentage can be determined by dividing the formula weight of the fluorine content (atoms) by the molecular weight of the gas-liquid. The following list illustrates these data for a group of compounds:
 a. 63.3% for HFC-152a (1,1-Difluoroethane) Flammable.
 b. 66.6% for HFO-1234yf (1,1,1,2-Tetrafluoroprop-1-ene) Slightly flammable.
 c. 66.6% for HFO-1234ze(E) (1,3,3,3-tetrafluoroprop-1-ene) Very slightly flammable.
 d. 67.3% for a mixture of 78% HFO-12234ze(E) & 22% HFO-1336mzz. Non-flammable.
 e. 69.5% for HFO-1336mzz (1,1,1,4,4,4-hexafluoro-2-butene) Non-flammable.
 f. 70.8% for HFC-245fa (1,1,1,3,3-Pentafluoropropane) Non-flammable.
 g. 74.6% for HFC-134a (1,1,1,2-Tetrafluoroethane) Non-flammable.
 h. 76.0% for FC-318 (Perfluorocyclobutane) Non-flammable
 i. 82.6% for FC-116 (Perfluoroethane) Non-flammable.

Listed products identified by a, f, g, h, and i have environmental detractions associated with global warming. As can be seen from b. and c. the positions of the fluorine atoms on these isomeric molecules can affect the degree of potential flammability.

Further limitations and disadvantages of traditional aerosol systems will become apparent to one of ordinary skill in the art through a comparison of such systems with the present invention described herein.

BRIEF SUMMARY OF THE INVENTION

A system and/or composition is provided primarily for the production of aerosol dusters, substantially as shown in and/or described in connection with at least one of the figures, as set forth more comprehensively in the claims.

These and other advantages, aspects and novel features of the present invention, as well as details of illustrated embodiments thereof, will be more fully understood from the following description and drawings.

BRIEF DESCRIPTION OF DRAWINGS

FIG. 1 is a table that describes the more important physical, environmental and toxicological properties of HFO-1234ze (E), (trans-1,3,3,3-tetrafluororoprop-1-ene).

FIG. 2 is a table that describes the more important physical, environmental and toxicological properties of HFO-1336mzz, (1,1,1,4,4,4-hexafluoro-2-butene).

FIG. 3 is a graphic representation that illustrates the temperatures at which flammable ranges exist for 100% HFO-1234ze(E), (trans-1,3,3,3-tetrafluoroprop-1-ene).

FIG. 4 is a graphic representation of the theoretical (ideal gas) and actual pressures of air-free solutions of HFO-1234ze (E) and HFO-1336mzz, at 21 C. (70 F.) and 54.4 C. (130 F.)

reference temperatures, and illustrating the azeotrope on the 21 C. (70 F.) trace of actual pressures.

DETAILED DESCRIPTION OF THE INVENTION

Certain embodiments of this invention may be found in a system and/or composition for use in aerosol dusters. Certain embodiments of this invention may comprise a composition of matter for achieving total non-flammability, while maintaining the initial composition throughout the life of the dispenser, thus assuring the maintenance of the desirable properties of total non-flammability, spray pattern, delivery rate and efficacy throughout the service life of the aerosol dispenser. The composition is considered to remain totally non-flammable under all reasonably foreseeable conditions. This salutary performance is due to our discovery that the composition of about 78% HFO-1234ze(E) and about 22% HFO-1336mzz surprisingly forms an azeotropic solution at 21 C. (70 F.) and by interpolation, up to about 36 C. (97 F.). The azeotropic effect disappears at higher temperatures, although even at 54.4 C. (130 F.) there is a remarkable increase in the pressure of HFO-1234ze(E) and HFO1336mzz blends, compared to the theoretical pressure, as can be calculated by the application of Raoult's Law.

Positive azeotropes, while uncommon, have always been thought to occur only when protic and aprotic liquids or gas-liquids are mixed. An example is the combination of 59% propane and 41% HFC-152a (1,1-difluoroethane). At 54.4 C. (130 F.) the mixture has an azeotropic pressure of 18.5 bars (268 psi-gauge), although the theoretical pressure should have been 13.8 bars (197 psi-gauge). This is because the non-polar propane molecules repel the highly polar HFC-152a molecules, and vice versa.

No abnormal pressure increase, and certainly no positive azeotrope would have been anticipated for two very similar, polyfluorinated hydrocarbon molecules, and fortuitously at about 22% of the HFO-1336mzz. A further complementary aspect is that, if a product were to be formulated with (say) 20% HFO-1336mzz, upon discharging the vapor, as in duster applications, the emitted gas would be less than 20% in HFO-1336mzz content, until the liquid composition reached the 22% HFO-1336mzz level. Conversely, if the composition were to be formulated with (say) 24% HFO-1336mzz, upon operating the duster the emitted gas would be greater than 24% in HFO-1336mzz content, until the liquid and gas composition reached the azeotropic proportion. After that the composition of both vapor and liquid would be identical, and would remain constant until the dispenser was emptied. The pressure would also remain constant at any given temperature.

Figure 1:
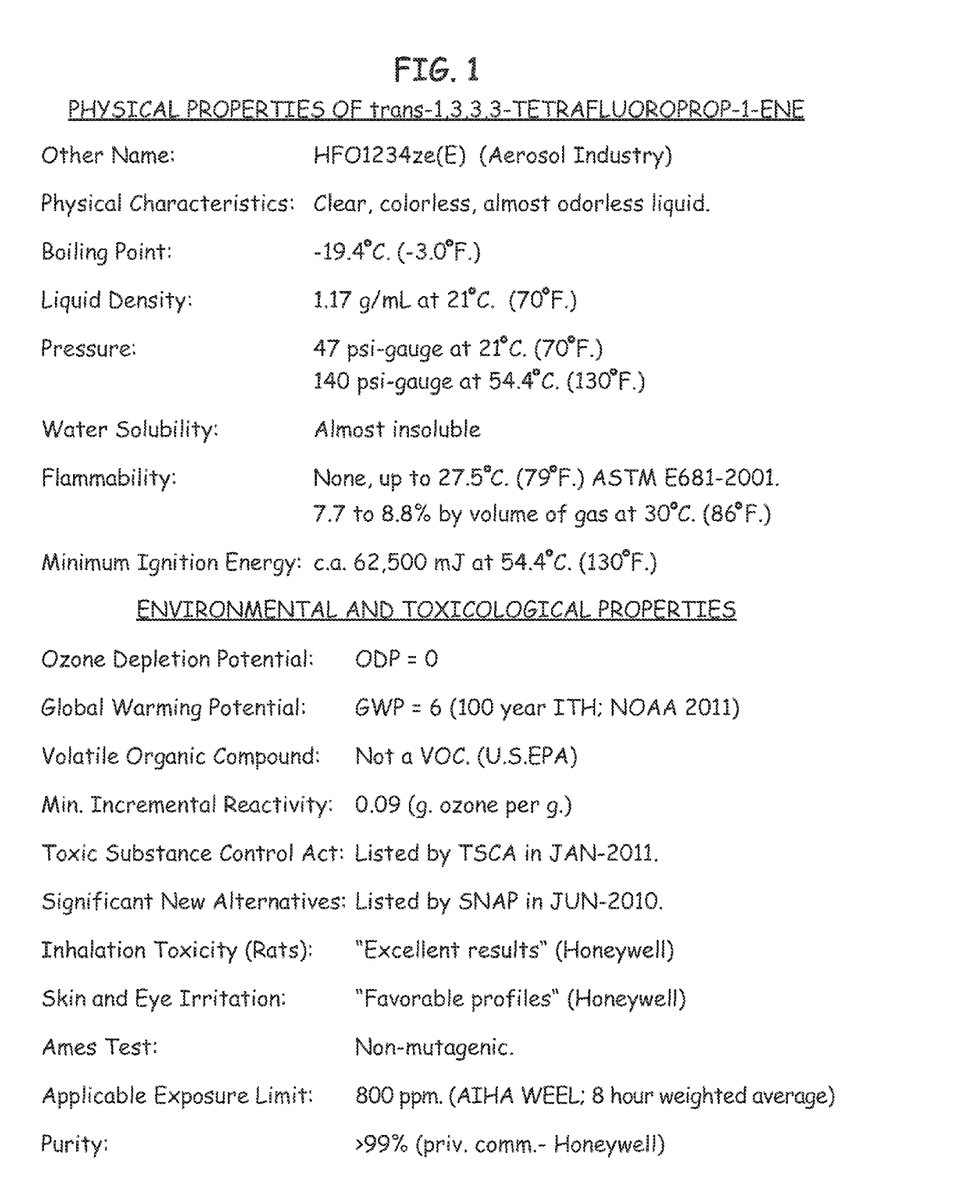

FIG. 1 describes a substantial number of physical, environmental and toxicological properties for trans-1,3,3,3-tetrafluoropro-1-ene, showing that it is quite safe and ideal for our intended use as the major component of a totally non-flammable solution, with trans-1,1,1,4,4,4-hexafluoro-2-butene as the minor component.

Figure 2:
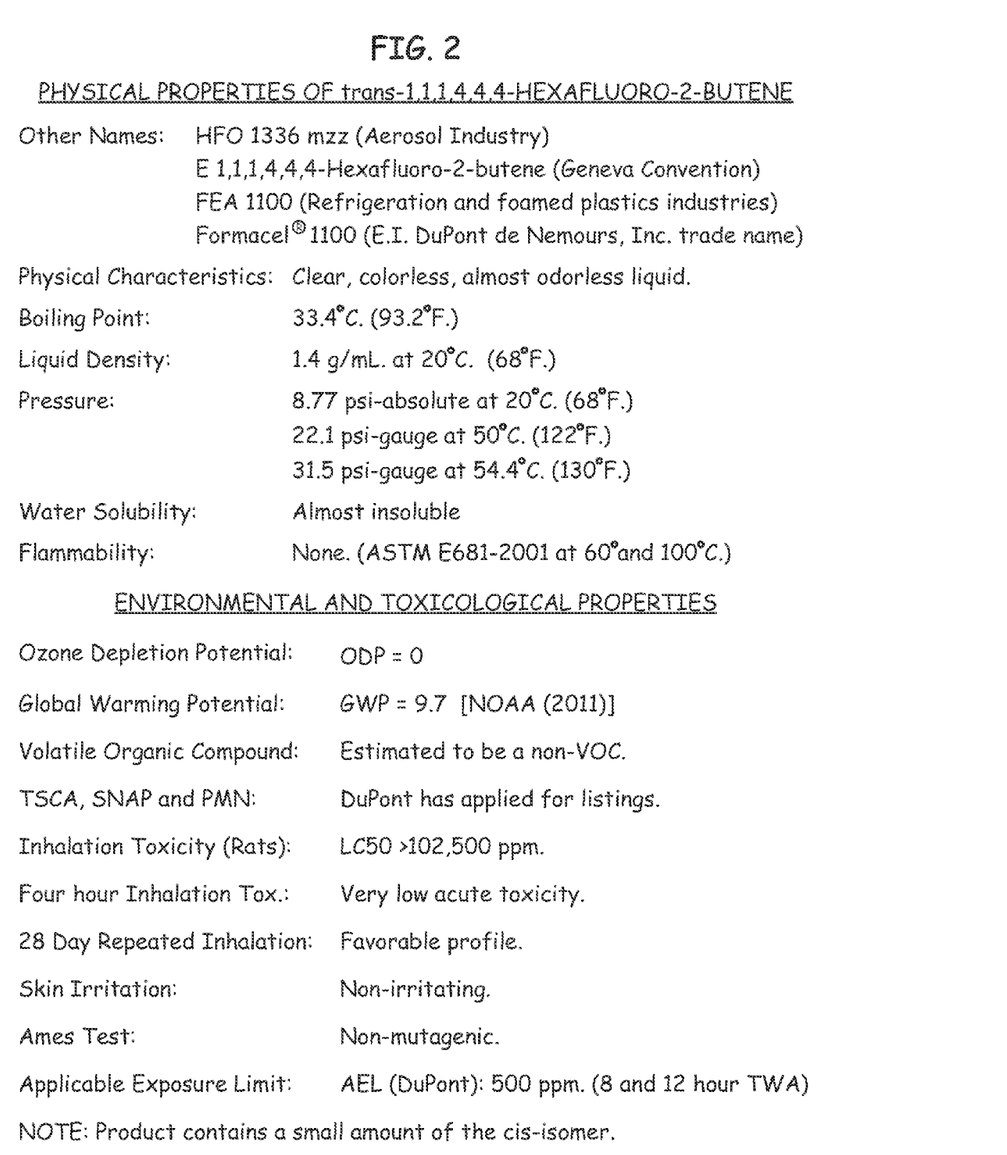

FIG. 2 describes a substantial number of physical, environmental and toxicological properties for trans-1,1,1,4,4,4-hexafluoro-2-butene, showing that it is quite safe and ideal for our intended use as the minor component of a totally non-flammable solution, with trans-1,3,3,3-tetrafluoroprop-1-ene as the major component.

Figure 3:
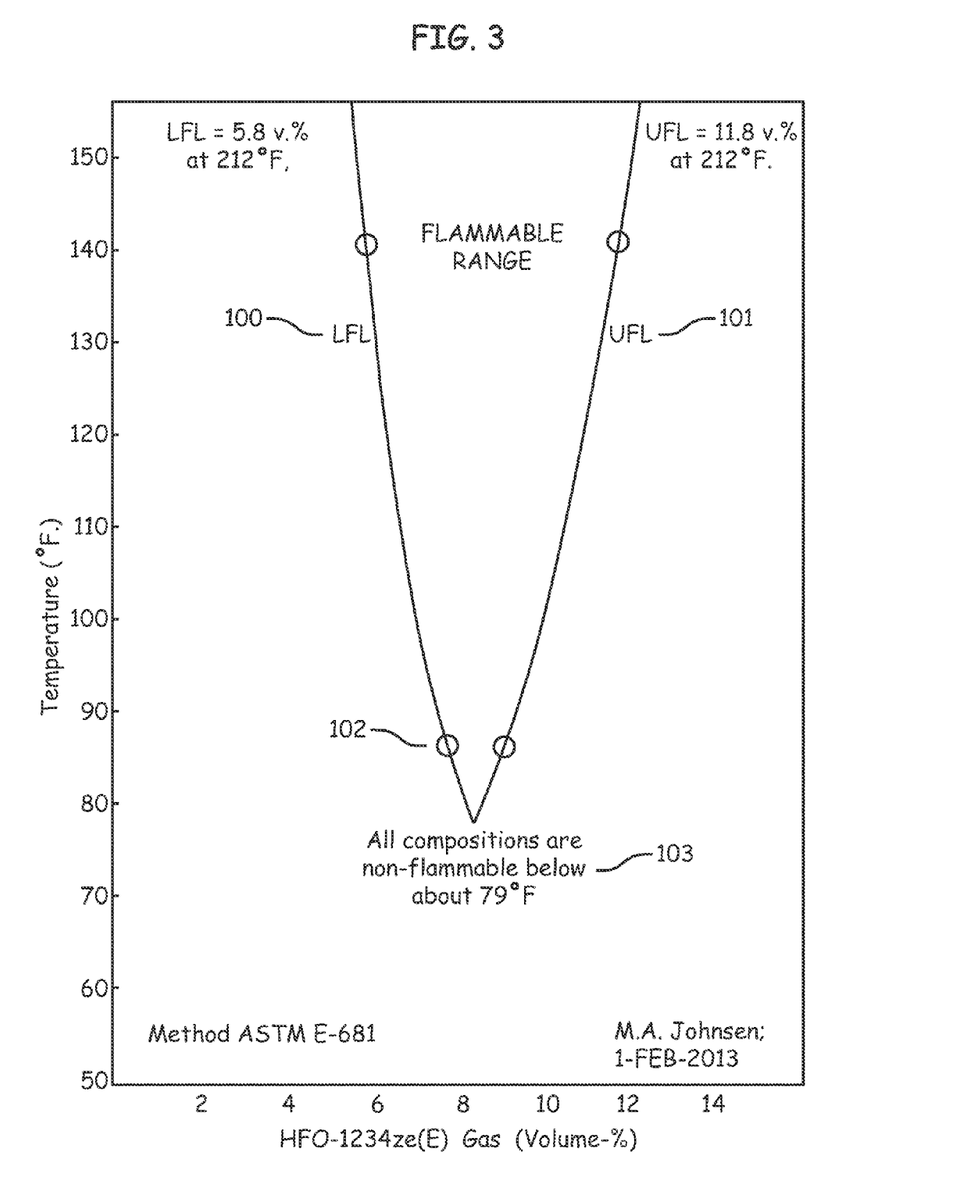

FIG. 3 depicts a graphic representation of the flammable range of HFO-1234ze(E), (trans-1,3,3,3-tetrafluoroprop-1-ene) gas in air as a function of volume-percent concentration and temperature. The left limb of the graph (100) indicates the LFL (Lower Flammable Limit) that exists at about 79 F. and higher temperatures. The right limb of the graph (101) indicates the UFL (Upper Flammable Limit, that exists at about 79 F. and higher temperatures. The small circles (102) indicate the results of experimental determinations of LFL and UFL, using Method ASTM E-681. Notations at the top of the graph present LFL and UFL data, determined at 212 F. by the same method. Lastly, (103) depicts the confluence of the LFL and UFL limbs at about 79 F.—the temperature below which all mixtures of HFO-1234ze(E) (trans-1,3,3,3-tetrafluoroprop-1-ene) gas and air are non-flammable by Method ASTM E-681.

Figure 4:
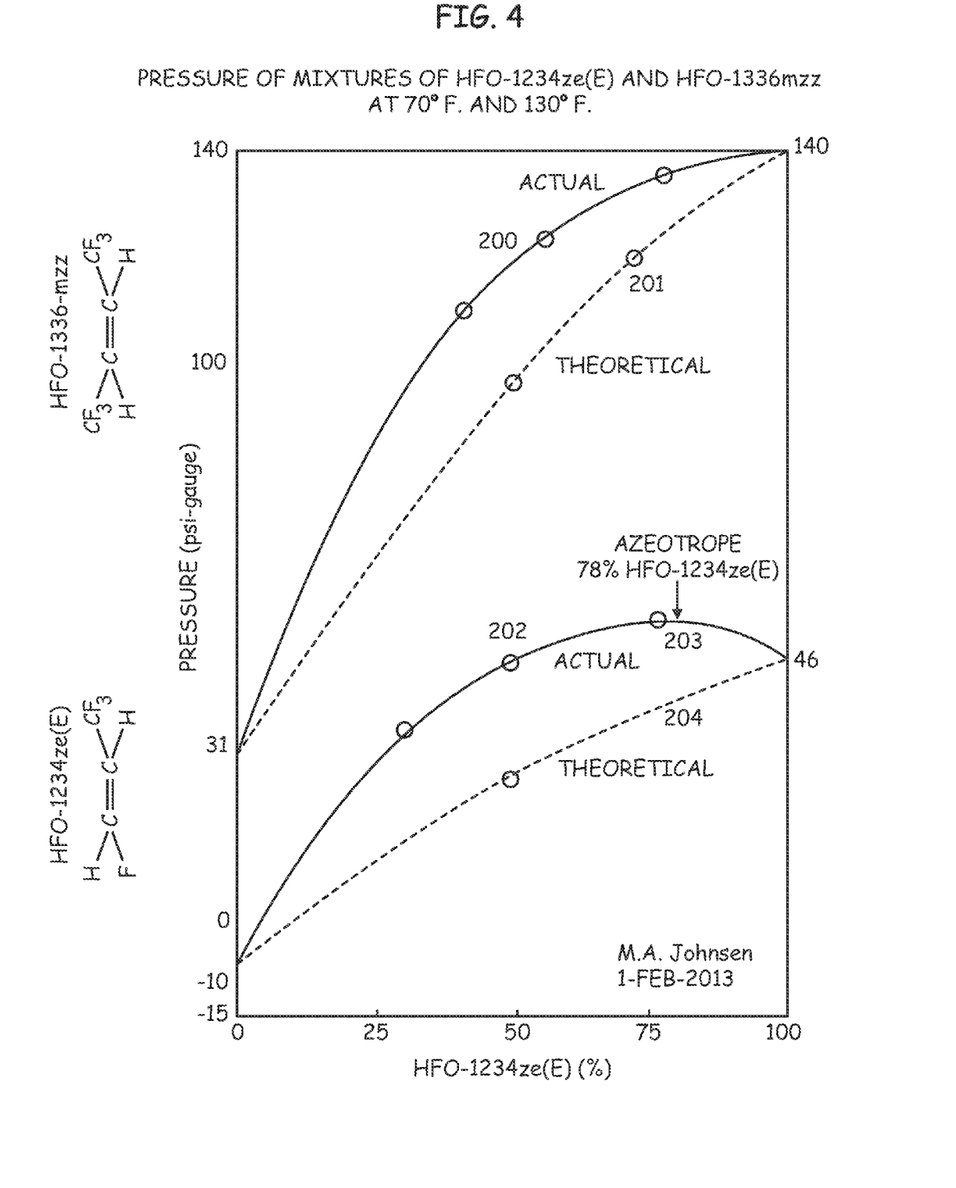

FIG. 4 depicts the pressures versus composition for the binary HFO1234ze(E) and HFO-1336mzz system. The pressures were determined for a number of air-free compositions, after equilibrating them to 21 C (70 F.) and 54.4 C. (130 F.). The curve identified as (200) is derived from and illustrates the experimental pressures of blends at 54.4 C. (130 F.). While the pressures are appreciably higher than those predicted by Raoult's Law for ideal gas mixtures (201), they do not exceed the pressure of 100% HFO-1234ze(E), and so there is no azeotrope. In contrast, the 21 C. (70 F.) experimental curve (202) does illustrate an azeotrope (203). The composition of the azeotrope is about 78% HFO-1234ze(E) and 22% HFO-1336mzz. The air-free azeotrope pressure is about 3.7 bars (53 psi-gauge) at 21 C. (70 F.) Again, the actual or experimental pressures are significantly higher than the theoretical ones, (205) as calculated by the application of Raoult's Law for ideal gas mixtures The curves illustrate the surprising fact that the molecules of the two, very similar HFO compounds repel each other, and more at the lower temperatures—leading to selective azeotrope formation at these lower temperatures, specifically those at or below about 36 C. (97 F.).

Figure 5:
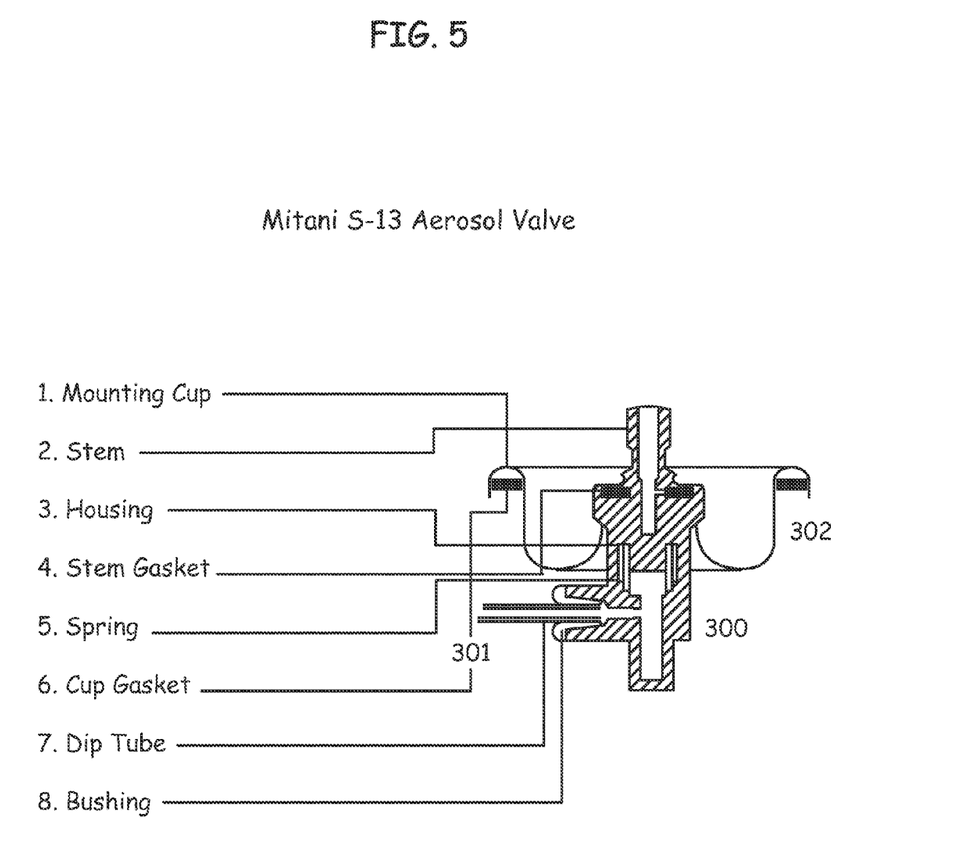
FIG. 5 is a cross section of a unique Mitani aerosol valve, considered to be superior for the spraying of duster products described in our invention.

In FIG. 5 a further embodiment of our invention is shown, which involves the use of a special aerosol valve, manufactured only by the Mitani Valve Company Ltd. in Japan, which we have modified in order to permit the aerosol dispenser to emit only the gas phase when actuated, whether the container is held vertically or horizontally. A cross-sectional view of the preferred valve is illustrated. The components are clearly marked. The lower portion of the valve body (300) has a side orifice position at a right angle to the primary centerline. We have inserted a short length of polypropylene capillary tubing, (301) typically with an inside diameter of about 1.00 mm. (0.039 inch) into this side orifice. The exposed length is adjusted to approximately 20 to 25 mm. (0.80 to 1.00 inch) so that, when the valve mounting cup (302) is sealed to the aerosol container the end of the short capillary side-tube will be about 2 mm. (0.08 inch) from the side wall of the dispenser.

Figure 6:
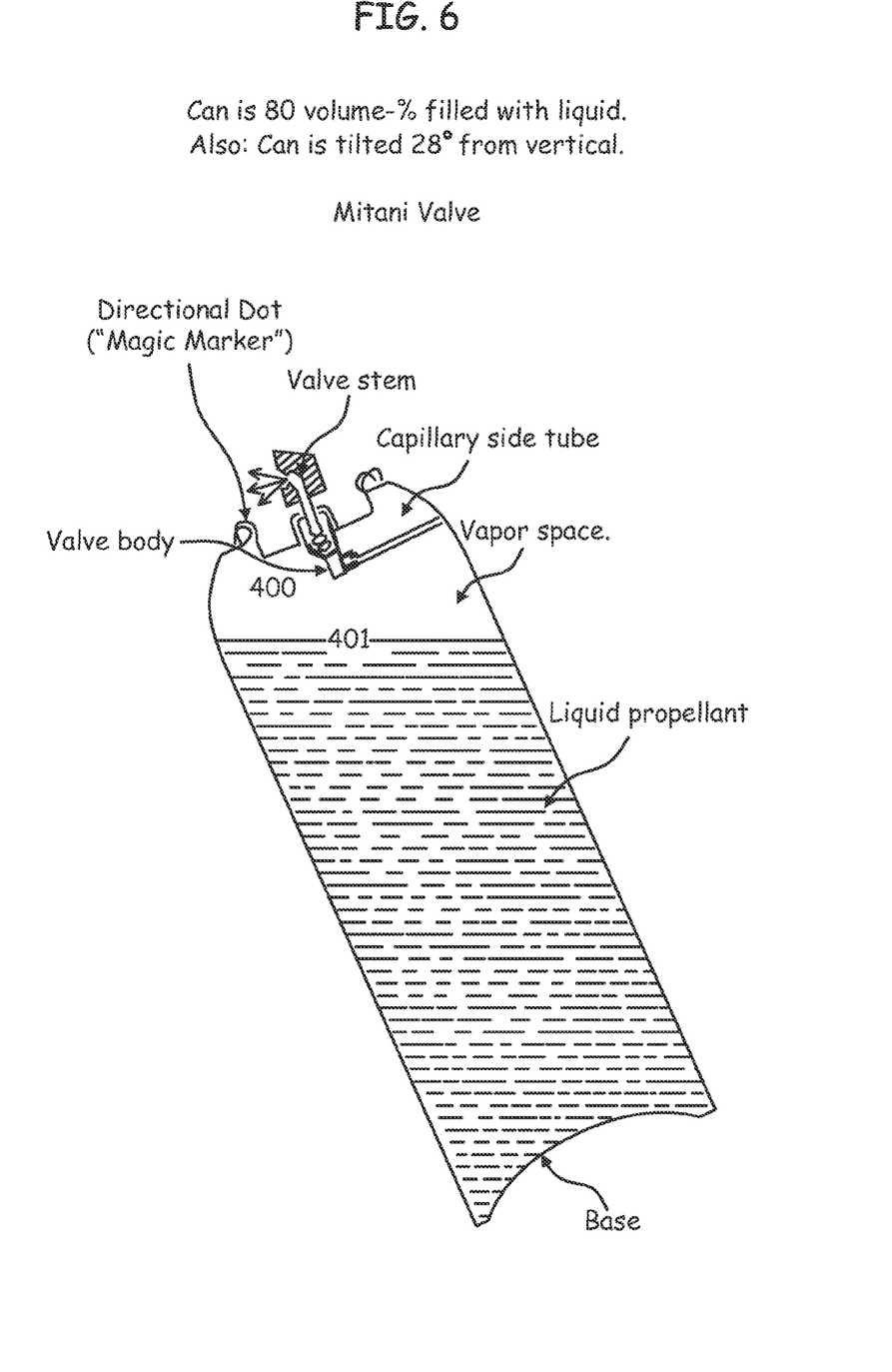
FIG. 6 is a cross-sectional view of an aerosol dispenser, fitted with a Mitani valve, held essentially upright and containing the composition of our invention, for removing dust from essentially vertical surfaces.

FIG. 6 illustrates that the special valve (400) is ideal for dispensing the gas phase from an aerosol dispenser that is held essentially upright, even if the liquid phase is filled up to 85% (401) of the can capacity. When the dispenser is used in this or similar positions the gas stream is directed at essentially vertical surfaces. These surfaces do not collect dust as easily or rapidly as horizontal surfaces, making this a less utilized dispenser position. Alternative vapor phase (no dip tube) valves work just as well as ours if the container is essentially vertical.

Figure 7:
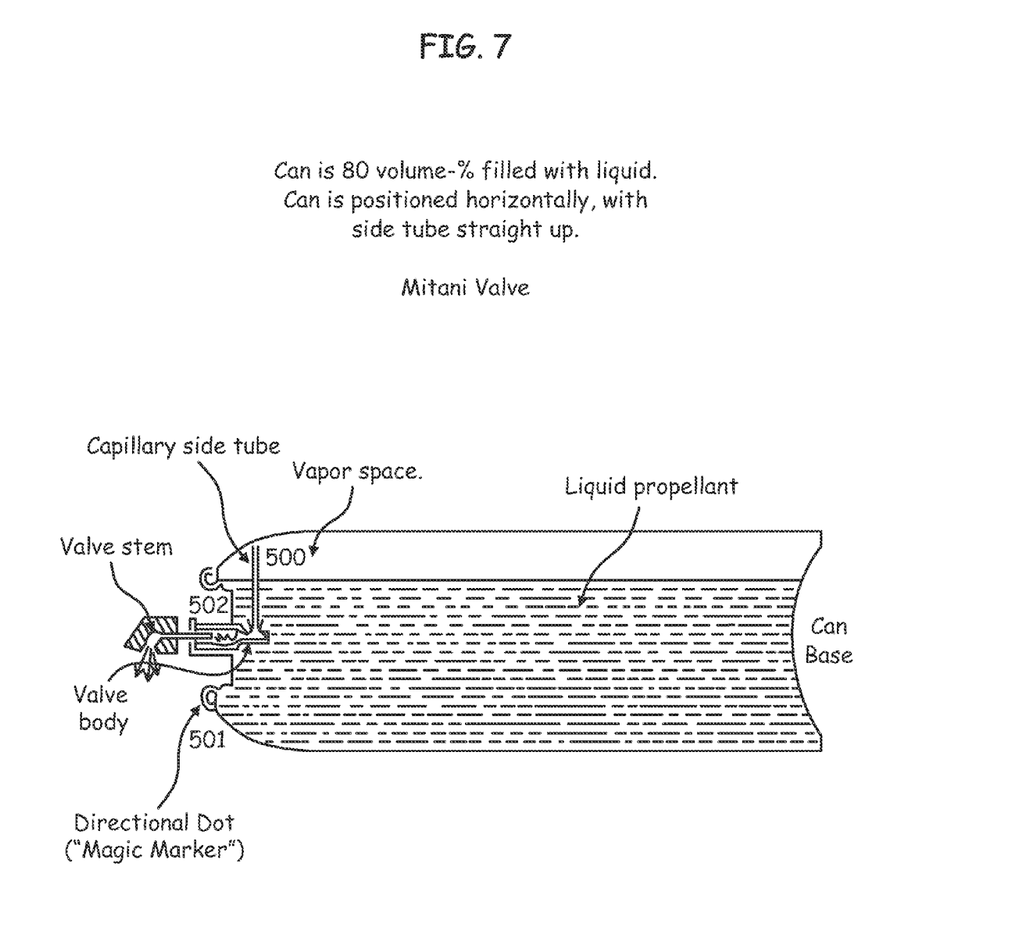
FIG. 7 is a cross-sectional view of an aerosol dispenser, fitted with a Mitani valve, held essentially horizontally and containing the composition of our invention, for removing dust from essentially flat surfaces.

FIG. 7 shows the dispenser in the more commonly used essentially horizontal attitude, for the dusting of essentially horizontal surfaces. The side tube (500) is designed to protrude into the gaseous phase (or head space). This is accomplished by having either the valve-maker or filler place a directional dot (501) on the crown of the valve mounting cup (502), at a position aligned at a 180 degree angle from the direction of the side tube. The valve actuator (503) is then pointed toward the directional dot, often during valve manufacture. In this way the capillary side tube (500) will always extend into the vapor phase. In the case of alternative vapor phase (no dip tube) valves the liquid phase would cover the centerline orifice of the valve body and the product would then spray the liquid, instead of the desired vapor phase. This has been a shortcoming of duster products and has caused some marketers to reduce product fills, as a percentage of dispenser capacity, providing a partial remedy.

Aside from the environmental and questionable future supply problems of HFC-134a, still the most commonly used duster propellant, it has a pressure of 12.97 bars (199 psi-gauge) at 54.4 C. (130 F.), which significantly exceeds the U.S. DOT limit of 12.41 bars (180 psi-gauge at that temperature. This means that marketers who use HFC-134a must apply to the U.S. DOT for a "Special Exemption" (renewable every year or two) and use very costly pressure-relief aerosol cans in order to market these dusters. In contrast, since the pressure of our preferred 78% HFO-1234ze(E) and 78% HFO-1336mzz blend (vacuum crimped) is less than 966 bars (120 psi-gauge at 54.4 C. (130 F.)) it can be marketed in the most widely used and lowest cost aerosol cans.

It is now necessary to define the different degrees of flammability, as used herein, and to mention certain tests and test results that relate directly to the invention.

Totally Non-Flammable: An aerosol product whose vapors cannot produce a flame propagation in air at ambient temperatures; i.e. below 40 C. (104 F.), when tested by the ASTM E-681 method, or in Europe by the EU A11 equivalent test method. Additionally, the product must pass all other official flammability tests, designed to control the precautionary labeling of aerosols and their outer shipping containers.

Almost Totally Non-Flammable: An aerosol product whose vapors can produce a flame propagation in air at ambient temperatures [20 to 40 C. (68 to 104 F.)] when tested by the ASTM E-681 method, or in Europe by the very similar EU A11 test method. Additionally, the product must pass all other official flammability tests, designed to control the precautionary labeling of aerosols and their outer shipping containers.

Essentially Non-Flammable: An aerosol product whose vapor can produce a flame propagation in air at or below ambient temperatures [below 20 C. (68 F.)] when tested by the ASTM E-681 method, or in Europe by the EU A11 equivalent test method, but which passes all other official flammability tests designed to control the precautionary labeling of aerosols and their outer shipping containers.

Marginally Non-Flammable: An aerosol that passes the applicable official flammability tests designed to control the precautionary labeling of the dispensers and their outer shipping containers, but when equilibrated to 21 C (70 F.) and sprayed through the top third of a candle flame from a distance of 152 mm. (6 inches) a flame propagation of less than 254 mm. (10 inches) is obtained.

Flammable: An aerosol that fails any of the applicable official flammability test methods designed to control the precautionary labeling of the dispenser and outer shipping containers.

As one aspect of the invention we have determined that an aerosol product with almost 99% of a mixture of 75% HFO-1234ze(E) and 25% HFO-1336mzz produced a Non Flammable result when tested by the ASTM E-681 Method, but with the temperature elevated to 40 C. (104 F.). The test result was so successful that it was concluded that the azeotropic mixture of 78%, quite possibly 77%, HFO-1234ze(E) would also be successful. As a note, the exact composition of the azeotropic blend cannot be determined with accuracy from the graph of FIG. 4, since the pressure curve is essentially flat at the apex.

Several additional tests were made to further assure the total non-flammability of the 78% HFO-1234ze(E) and 22% HFO-1336mzz azeotropic solution. For example, the Flame Propagation Test was performed on aerosols containing the blend, pre-heated to 40 C (104 F.) and also to 50 C. (122 F.). No flame propagation was observed. In fact, by spraying the product more directly on the candle flame the flame was extinguished. The Closed Drum Test was performed, where the device was at a temperature of 34 C. (93 F.). It was impractical to add vapor to the drum, due to the cooling effect on the dispenser, across an extended time period. So the liquid phase was discharged into the drum. Eighty grams of product were directed into the drum. No flame propagation was observed. The test was terminated due to the irritating effect of pyrolysis gases generated in the drum by the candle flame.

The choice of the 40 C. (104 F.) testing temperature for the ASTM E-681 method of analysis for possible flammability is based on the premise that aerosol dusters will virtually never be used at temperatures higher than this. Also, a totally non-flammable result will assure that the same result will be obtained if the same test was conducted at lower temperatures. A totally non-flammable result will also prove that the preferred blends of HFO-1234ze(E) and HFO-1336mzz (including the azeotropic blend) are safer to use than pure HFO-1234ze(E), which has a significant flammability range at temperatures above about 26 C. (79 F.). Since the blends of HFO-1234ze(E) and HFO-1336mzz are true solutions, and since blends where the percentage of HFO-1234ze(E) is somewhat greater or smaller than the azeotropic composition will rather quickly change in composition to that of the azeotropic blend when the aerosol dispenser is activated, the total non-flammability of our preferred blends will remain in effect throughout the life of the product. In contrast to many aerosols, no shaking of the can is required prior to use.

It is recognized that skilled formulators may attempt to utilize other totally non-flammable solvents or propellants, in order to make HFO-1234ze(E) totally non-flammable, for such products as dusters, boat horns, freezants for electronic circuit board testing, smoke detector testers and other specialty products. These may include HFC-134a (1,1,1,2-tetrafluoroethane), iodotrifluoromethane ($CIF_3$), HFC-227ea (1,1,1,2,3,3,3-heptafluoropropane) and certain other polyfluorinated alkanes or olefins. Attempts to use HFC-134a, HFC-227ea and other highly fluorinated alkanes are considered ill-advised because of their well-publicized intense global warming potentials and the steps being taken to eliminate them, with the exception of life safety and health aerosol products. $CIF_3$ is a non-commercial product at this time. Its boiling point is −22.5 C. (−8 F.). Currently, its global warming potential has not been determined. Other iodine-based alkanes include iododifluoromethane ($CHIF_2$), boiling at 21.6 C. (71 F.) and iodofluoromethane ($CH_2IF$) boiling at 53.4 C. (128.5 F.). They are laboratory curiosities whose physical, environmental and toxicological properties have yet to be fully elucidated. No reports of azeotropic activity have been seen. Such oddities as non-flammable trifluoroacetaldehyde ($CF_3$—CHO), boiling point −18.8 C. (−1.8 F.), have also been considered, but their odors and reprehensible toxicological properties cannot be tolerated. From this brief background it is possible that HFO-1336mzz may be one of the very few, if any, additives that uniquely provides all the desired physical (including azeotropic), environmental and environmental properties when formulated with HFO-1234ze(E)—plus total non-flammability, when utilized in concentrations of about 20% or greater. One can always theorize about the effects of adding some unknown solvent or propellant as an alternative to HFO-1336mzz. For example, there is HFO-1327mz (1,1,1,2,4,4,4-heptafluoro-1-butene), which may be useful, but it properties are almost totally unknown.

For completeness it should be mentioned that HFO-1336mzz exists in cis- and trans-structures. The cis-structure would be properly designated as CFO-1336mzz(Z) and the trans-structure as CFO-1336mzz(E). DuPont has developed the 100% cis-form, which they designate as z 1,1,1,4,4,4-hexafluoro-2-butene and use the trade names FEA 1100 and FORMACEL® 1100. The CAS (Chemical Abstracts System) Number is 692-49-9. The trans-form, which is virtually identical in total non-flammability, physical properties and so forth, may be mixed with a preponderance of the cis-form for various applications. These mixtures are simply designated as HFO-1336mzz—without the (Z) or (E) extension.

Advantages of the totally non-flammable aerosol duster (and similar) products of our invention include:

1. Ultimate safety in use—including in highly sensitive areas where ignition sources be present.
2. The use of ingredients that are environmentally innocuous—no stratospheric ozone depletion, negligible tropospheric ozone production and a negligible global warming potential.
3. A replacement for HFC-134a, which has the significant global warming potential of 1320 times the effect of carbon dioxide and is starting to be phased out.
4. No other totally non-flammable, viable substitute for HFC-134a is known to exist.
5. HFO-1234ze(E) is approved and listed on the U.S. EPA's Toxic Substances Control Act (TSCA) chemical substance inventory, as well as the Significant New Aerosol Propellants (SNAP) program for alternative propellants. HFO-1336mzz has been submitted for TSCA approval by DuPont and listing is anticipated soon. A SNAP listing is not required since HFO-1336mzz is not a gas (propellant). Note: The GHS (Globally Harmonized System of Classification and Labeling of Chemicals) defines a gas as a chemical having a vapor pressure of 101.3 kPa (one atmosphere) at 20 C. (68 F.).
6. In the atmosphere the half-life of both HFO-1234ze(E) and HFO-1336mzz is less than about 10 days. Thus, they are not bio-accumulative and are not VOCs (Volatile Organic Compounds). The U.S. EPA has confirmed this for HFO-1234ze(E) and is processing an application by DuPont for a similar conclusion regarding HFO-1336mzz.
7. The 75% HFO-1234ze(E) and 25% HFO-1336mzz blend has been tested by the world-famous Chilworth Technology Inc. firm for total non-flammability at 40 C. (104 F.) and confirmed as non-flammable at this temperature by the ASTM E-681 Method.
8. HFO-1234ze(E) has been listed in the European REACH (Registration, Evaluation, Authorization and Restriction of Chemical Substances) compendium. DuPont plans to submit a similar registration for their HFO-1336mzz product.
9. The use of a uniquely modified version of the Mitani Valve Company, Ltd. Series S13OP aerosol valve for the duster product permits the vapor phase of the product to be discharged when the dispenser is held vertically, horizontally, or at any intermediate angle, regardless of the safe liquid fill volume as a percentage of container capacity. To our belief this flexibility is not possible with any other aerosol valve.
10. The totally non-flammable mixture of about 75% HFO-1234ze(E) and 75% HFO-1336mzz eliminates the flammable range of 100% HFO-1234ze, up to at least 40 C. (104 F.) and maintains this advantage throughout the service life of the aerosol dispenser.

The totally non-flammable mixtures of HFO-1234ze(E) and HFO-1336mzz, and preferably the azeotropic mixture, may be utilized beneficially for boat horns, smoker alarm testers, certain lubricants, and in the liquid dispensing form, for freezant testing of connect-ions on electronic circuit boards, and for several other applications.

With the forthcoming absence of HFC-134a, except for a few approved medical applications involving health and life safety issues, we are not aware of any other totally non-flammable propellant or blend that can provide aerosol marketers with the highly desirable physical, environmental and toxicological properties of our preferred mixtures of HFO-1234ze(E) and HFO-1336mzz, and in particular, the azeotropic composition. Upon the anticipated U.S. EPA approval of HFO-1336mzz for listing in TSCA, and similarly for listing in Europe's REACH compendium, there are no regulatory deterrents for commercialization of products herein described.

What is claimed is:

1. A method, comprising:
   dispensing a vapor from a dispenser, wherein the vapor comprises about 60% to 95% by weight trans-1,3,3,3-tetrafluoroprop-1-ene and about 5% to 40% by weight 1,1,1,4,4,4-hexafluoro-2-butene.
2. The method of claim 1, wherein the vapor comprises about 75%-80% by weight trans-1,3,3,3-tetrafluoroprop-1-ene.
3. The method of claim 1, wherein the vapor comprises about 78% by weight trans-1,3,3,3-tetrafluoroprop-1-ene.
4. The method of claim 1, wherein the vapor comprises about 20% to 25% by weight 1,1,1,4,4,4-hexafluoro-2-butene.
5. The method of claim 1, wherein the vapor comprises about 22% by weight 1,1,1,4,4,4-hexafluoro-2-butene.
6. The method of claim 1, further comprising:
   maintaining a liquid in the dispenser, wherein the liquid comprises about 60% to 95% by weight trans-1,3,3,3-tetrafluoroprop-1-ene and about 5% to 40% by weight 1,1,1,4,4,4-hexafluoro-2-butene.
7. The method of claim 6, wherein the liquid comprises about 75%-80% by weight trans-1,3,3,3-tetrafluoroprop-1-ene.
8. The method of claim 6, wherein the liquid comprises about 78% by weight trans-1,3,3,3-tetrafluoroprop-1-ene.
9. The method of claim 6, wherein the liquid comprises about 20% to 25% by weight 1,1,1,4,4,4-hexafluoro-2-butene.
10. The method of claim 6, wherein the liquid comprises about 22% by weight 1,1,1,4,4,4-hexafluoro-2-butene.

11. A method, comprising:
- dispensing a vapor from a dispenser, wherein the vapor comprises about 75%-80% by weight trans-1,3,3,3-tetrafluoroprop-1-ene and about 20% to 25% by weight 1,1,1,4,4,4-hexafluoro-2-butene; and
- maintaining a liquid in the dispenser, wherein the liquid comprises about 75%-80% by weight trans-1,3,3,3-tetrafluoroprop-1-ene and about 20% to 25% by weight 1,1,1,4,4,4-hexafluoro-2-butene.

12. The method of claim 11, wherein the vapor comprises about 78% by weight trans-1,3,3,3-tetrafluoroprop-1-ene.

13. The method of claim 11, wherein the vapor comprises about 22% by weight 1,1,1,4,4,4-hexafluoro-2-butene.

14. A method, comprising:
- dispensing a vapor from a dispenser, wherein the vapor comprises about 78% by weight trans-1,3,3,3-tetrafluoroprop-1-ene and about 22% by weight 1,1,1,4,4,4-hexafluoro-2-butene; and
- maintaining a liquid in the dispenser, wherein the liquid comprises about 78% by weight trans-1,3,3,3-tetrafluoroprop-1-ene and about 22% by weight 1,1,1,4,4,4-hexafluoro-2-butene.

* * * * *